(12) United States Patent
Uhr et al.

(10) Patent No.: US 11,538,036 B2
(45) Date of Patent: Dec. 27, 2022

(54) SYSTEM AND METHOD FOR VERIFYING FORGERY OF FINANCIAL INSTITUTION PROOF DOCUMENTS ON BASIS OF BLOCK CHAIN

(71) Applicant: Coinplug, Inc., Gyeonggi-do (KR)

(72) Inventors: Joon Sun Uhr, Gyeonggi-do (KR); Jay Wu Hong, Seoul (KR); Joo Han Song, Gyeonggi-do (KR)

(73) Assignee: COINPLUG, INC., Gyeonggi (KR)

( * ) Notice: Subject to any disclaimer, the term of this patent is extended or adjusted under 35 U.S.C. 154(b) by 192 days.

(21) Appl. No.: 15/845,224

(22) Filed: Dec. 18, 2017

(65) Prior Publication Data

US 2018/0121923 A1 May 3, 2018

Related U.S. Application Data

(63) Continuation of application No. PCT/KR2016/006483, filed on Jun. 17, 2016.

(30) Foreign Application Priority Data

Jun. 18, 2015 (KR) .......................... 10-2015-0086457

(51) Int. Cl.
*G06Q 20/40* (2012.01)
*G06F 21/64* (2013.01)
(Continued)

(52) U.S. Cl.
CPC ......... *G06Q 20/4016* (2013.01); *G06F 21/64* (2013.01); *G06Q 20/223* (2013.01);
(Continued)

(58) Field of Classification Search
None
See application file for complete search history.

(56) References Cited

U.S. PATENT DOCUMENTS 5,903,882 A * 5/1999 Asay .................... G06Q 10/10
380/30
6,622,247 B1 * 9/2003 Isaak .................... H04L 9/3263
713/155
(Continued)

FOREIGN PATENT DOCUMENTS

JP  2002-062803 A   2/2002
KR  10-2003-0020675  3/2003
(Continued)

OTHER PUBLICATIONS

Bitcoin: A Peer-to-Peer Electronic Cash System (Satoshi Nakamoto / NPL Retrieved Jul. 4, 2010).*
(Continued)

*Primary Examiner* — Jacob C. Coppola
*Assistant Examiner* — Eduardo Castilho
(74) *Attorney, Agent, or Firm* — Xsensus LLP (57) ABSTRACT

Transaction ID information corresponding to proof certificate-verifying transaction information is transmitted to a block chain retention server if a request for proof certificate information is sensed, when the proof certificate-verifying transaction information generated by using the proof certificate information, to be provided to a customer, is recorded in a block chain retention server and the transaction ID information is managed. The proof certificate-verifying transaction information corresponding to the transaction ID information is acquired from the block chain retention server. A proof certificate index hash value used for comparison, acquired from the proof certificate information to be provided to a customer and corresponding to a request, is compared with a proof certificate-verifying index hash value acquired from the proof certificate verifying-transaction information. Verification information generated with reference to the comparison result of the proof certificate index
(Continued)

hash value used for comparison and the proof certificate-verifying index hash value are provided.

7 Claims, 6 Drawing Sheets

(51) Int. Cl.
| | |
|---|---|
| *H04L 9/32* | (2006.01) |
| *G06Q 20/22* | (2012.01) |
| *G06Q 20/38* | (2012.01) |
| *G06Q 20/36* | (2012.01) |
| *G06Q 20/06* | (2012.01) |
| *H04L 9/00* | (2022.01) |
| *G06Q 40/02* | (2012.01) |
| *G06Q 40/00* | (2012.01) |

(52) U.S. Cl.
CPC ......... *G06Q 20/36* (2013.01); *G06Q 20/3827* (2013.01); *G06Q 20/3829* (2013.01); *G06Q 20/38215* (2013.01); *G06Q 20/40* (2013.01); *H04L 9/32* (2013.01); *H04L 9/3236* (2013.01); *H04L 9/3263* (2013.01); *G06Q 20/065* (2013.01); *G06Q 40/00* (2013.01); *G06Q 40/02* (2013.01); *G06Q 2220/00* (2013.01); *H04L 9/50* (2022.05); *H04L 2209/56* (2013.01)

(56) References Cited

U.S. PATENT DOCUMENTS

| | | | | |
|---|---|---|---|---|
| 6,807,633 | B1* | 10/2004 | Pavlik | H04L 9/3247 713/180 |
| 8,132,013 | B2* | 3/2012 | Meier | G06F 21/64 705/57 |
| 2001/0037313 | A1* | 11/2001 | Lofgren | G06Q 20/3823 705/67 |
| 2003/0093678 | A1* | 5/2003 | Bowe | H04L 9/3236 713/180 |
| 2009/0144382 | A1* | 6/2009 | Benninghoff, III | H04L 63/126 709/206 |
| 2009/0240936 | A1* | 9/2009 | Lambiase | H04L 9/3263 713/156 |
| 2010/0058064 | A1* | 3/2010 | Kirovski | H04L 63/0853 713/176 |
| 2012/0233029 | A1* | 9/2012 | Piersol | G06Q 30/00 705/34 |
| 2014/0201057 | A1 | 7/2014 | Shuster | |
| 2015/0131797 | A1* | 5/2015 | Ashley | H04L 9/3263 380/270 |
| 2015/0356523 | A1* | 12/2015 | Madden | G06Q 20/065 705/76 |
| 2016/0162897 | A1* | 6/2016 | Feeney | G06Q 20/065 705/71 |
| 2016/0283920 | A1* | 9/2016 | Fisher | H04L 9/3297 |
| 2016/0300234 | A1* | 10/2016 | Moss-Pultz | G06Q 20/3827 |
| 2016/0321769 | A1* | 11/2016 | McCoy | G06F 21/10 |
| 2016/0330027 | A1* | 11/2016 | Ebrahimi | H04L 9/302 |
| 2016/0330034 | A1* | 11/2016 | Back | G06Q 20/065 |
| 2016/0342977 | A1* | 11/2016 | Lam | G06Q 20/0658 |
| 2016/0350728 | A1* | 12/2016 | Melika | G06Q 20/02 |

FOREIGN PATENT DOCUMENTS

| | | |
|---|---|---|
| KR | 10-20030-078527 A | 10/2003 |
| KR | 10-0447448 B1 | 8/2004 |
| KR | 10-2007-0099230 A | 10/2007 |
| KR | 10-2009-0000740 | 1/2009 |

OTHER PUBLICATIONS

Bitcoin: A Peer-to-Peer Electronic Cash System (Satoshi Nakamoto / NPL Retrieved Jul. 4, 2010) (Year: 2010).*
H. Kim, Y. Lee and M. Jun, "Design and Implementation of Certificate Validation Mechanism Using Reduction Signature in Distributed Domain Environment," 2008 Third International Conference on Convergence and Hybrid Information Technology, 2008, pp. 591-595, doi: 10.1109/ICCIT.2008.91. (Year: 2008).*
R. Martinez-Pelaez, C. Satizabal, F. Rico-Novella and J. Forne, "Efficient Certificate Path Validation and Its Application in Mobile Payment Protocols," 2008 Third International Conference on Availability, Reliability and Security, 2008, pp. 701-708, doi: 10.1109/ARES.2008.101. (Year: 2008).*
M. O. Albasheer and E. B. M. Bashier, "Enhanced model for PKI certificate validation in the mobile banking," 2013 International Conference on Computing, Electrical and Electronic Engineering (ICCEEE), 2013, pp. 470-476, doi: 10.1109/ICCEEE.2013.6633984. (Year: 2013).*
H. Kim, Y.-G. Lee and M.-S. Jun, "Design and Implementation of Certificate Validation Mechanism Using Reduction Signature in Distributed Domain Environment," 2008 Third International Conference on Convergence and Hybrid Information Technology, 2008, pp. 591-595, doi: 10.1109/ICCIT.2008.91. (Year: 2008).*
D. Jayasinghe, K. Markantonakis and K. Mayes, "Optimistic Fair-Exchange with Anonymity for Bitcoin Users," 2014 IEEE 11th International Conference on e-Business Engineering, 2014, pp. 44-51, doi: 10.1109/ICEBE.2014.20. (Year: 2014).*
E. Syta, Iulia Tamas, Dylan Visher, David Isaac Wolinsky and Bryan Ford et al. (2015). "Decentralizing Authorities into Scalable Strongest-Link Cothorities," CoRR, abs/1503.08768. (Year: 2015).*
Bitcoin technology is also used for certificate issuance, http://www.bloter.net/archives/207040, Sep. 19, 2014.

* cited by examiner

SYSTEM AND METHOD FOR VERIFYING FORGERY OF FINANCIAL INSTITUTION PROOF DOCUMENTS ON BASIS OF BLOCK CHAIN

CROSS REFERENCE TO RELATED APPLICATIONS

This application is a continuation of prior International Application PCT Application No. PCT/KR2016/006483 filed on Jun. 17, 2016, which claims the benefit of priority from Korean Patent Application No. 10-2015-0086457 filed on Jun. 18, 2015. The disclosures of International Application PCT Application No. PCT/KR2016/006483 and Korean Patent Application No. 10-2015-0086457 are incorporated herein by reference.

FIELD OF THE INVENTION

The present invention relates to a method for verifying authenticity of a financial institution (FI) certificate based on a blockchain and a system using the same, by comparing the FI certificate at the time of an initial issuance and the FI certificate of the same contents issued later at a client's request.

BACKGROUND OF THE INVENTION

As financial transaction methods and channels diversify and information related to financial transactions are used in various fields, numerous certificates like a certificate of deposit balance, a debt certificate, a bank guarantee, a transaction history, a financial information statement, a letter of credit, etc. are frequently issued from the financial institutions.

However, clients have to go to an actual place and request the certificates, which is cumbersome and time-consuming.

To resolve this problem, a conventional electronic certificate issuing system, Korean Patent Laid-Open Publication No. 10-2009-0000740, published on Jan. 8, 2009, is comprised of a means of receiving information on a requested certificate including a type, a purpose, a client, a means of extracting at least one piece of certificate information corresponding to the information on the requested certificate from a certain ledger or a database, a means of creating and storing an electronic document including the certificate information in an electronic document vault, and a means of issuing the certificate by transmitting the electronic certificate stored in the vault to a terminal.

Using this system, the client may receive the certificates in real-time using the terminal at a remote place without physical access to a financial institution.

In general, a seal, an embossed seal, or a stamp, etc. of a financial institution's head officer is used to prove that an issued certificate is not forged.

Clearly, the conventional electronic certificate issuing system cannot provide an official seal like a seal, an embossed seal, or a stamp, etc. that can determine whether an issued certificate is authentic or forged.

However, this problem was resolved by a document issuing and authenticating system utilizing a conventional watermarking technology, e.g., Korean Patent Laid-Open Publication No. 10-2003-0020675, published on Mar. 10, 2003.

In detail, the document issuing and authenticating system utilizing the conventional watermarking technology offers services that can issue an online certificate with an embedded watermark, and an institution or a company verifies integrity and authenticity of the online certificate submitted from a customer by extracting the watermark embedded in the certificate using a watermark extracting algorithm.

However, in case of the document issuing and authenticating system utilizing the conventional watermarking technology, forgery of documents is determined only by a fact whether the watermark is embedded into the certificate, therefore, if the watermark is embedded after the issued certificate is forged, then this forged certificate is recognized as an authentic certificate, which poses a problem that renders the system useless.

SUMMARY OF THE INVENTION

It is an object of the present invention to solve all the aforementioned problems.

It is another object of the present invention to provide a method for verifying authenticity of a financial institution certificate based on a blockchain and a system using the same, by comparing a certificate at the time of an initial issuance and a certificate of the same contents issued later at the client's request.

In accordance with one aspect of the present invention, there is provided a method for verifying a financial institution (FI) certificate based on a blockchain, including steps of: (a) a managing server, on condition that transaction information for verification generated by using information on a first FI certificate is recorded on a blockchain server, and that a transaction ID corresponding to the transaction information for verification is being managed, if a request for determining whether a second FI certificate is verified or not is detected, transmitting or supporting another device to transmit the transaction ID to the blockchain server, wherein the request includes information corresponding to the transaction ID and wherein the second FI certificate is to be verified against the first FI certificate; (b) the managing server acquiring or supporting another device to acquire the transaction information for verification from the blockchain server; (c) the managing server comparing or supporting another device to compare (i) a first index hash value which is an index hash value, to be used for referring to the first FI certificate, acquired from the transaction information for verification, and (ii) a second index hash value which is an index hash value, to be used for verifying the second FI certificate, acquired from the information on the second FI certificate; and (d) the managing server providing or supporting another device to provide a verification result generated by referring to a comparison between the first index hash value and the second index hash value.

In accordance with another aspect of the present invention, there is provided a managing server for verifying a financial institution (FI) certificate based on a blockchain, including: a communication part for, on condition that transaction information for verification generated by using information on a first FI certificate is recorded on a blockchain server, and that a transaction ID corresponding to the transaction information for verification is being managed, if a request for determining whether a second FI certificate is verified or not is detected, (i) transmitting or supporting another device to transmit the transaction ID to the blockchain server and (ii) acquiring or supporting another device to acquire the transaction information for verification from the blockchain server, wherein the request includes information corresponding to the transaction ID and wherein the second FI certificate is to be verified against the first FI certificate; a processor for (i) comparing or supporting another device to compare (i-1) a first index hash value which is an index hash value, to be used for referring to the first FI certificate, acquired from the transaction information for verification, and (i-2) a second index hash value which is an index hash value, to be used for verifying the second FI certificate, acquired from the information on the second FI certificate and (ii) providing or supporting another device to provide a verification result generated by referring to a comparison between the first index hash value and the second index hash value.

DETAILED DESCRIPTION OF THE PREFERRED EMBODIMENTS

The embodiments below of the present invention will be described in sufficient detail by referring to attached drawings regarding configurations and effects of the embodiments.

Figure 1:
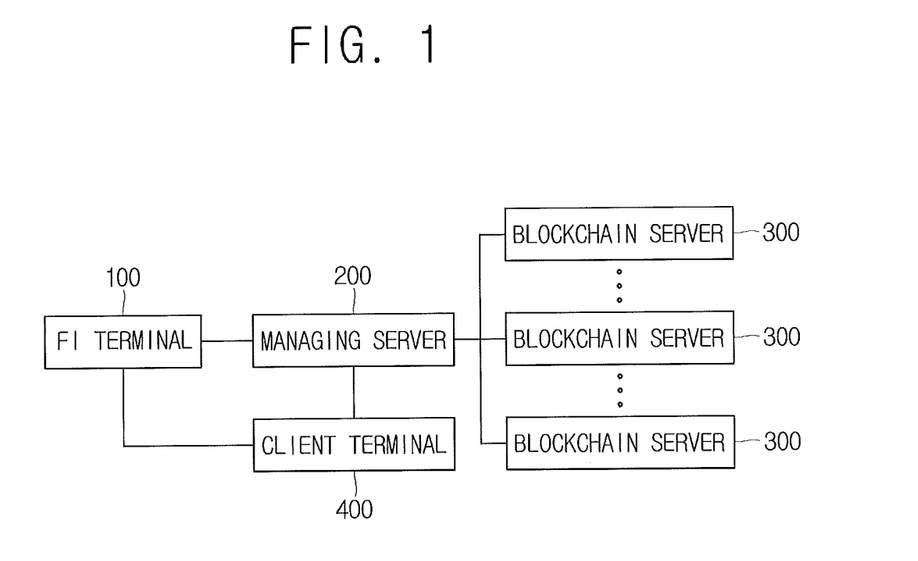
FIG. 1 is a configurational diagram illustrating a system for verifying a financial institution (FI) certificate based on a blockchain in accordance with the present invention.
Figure 2:
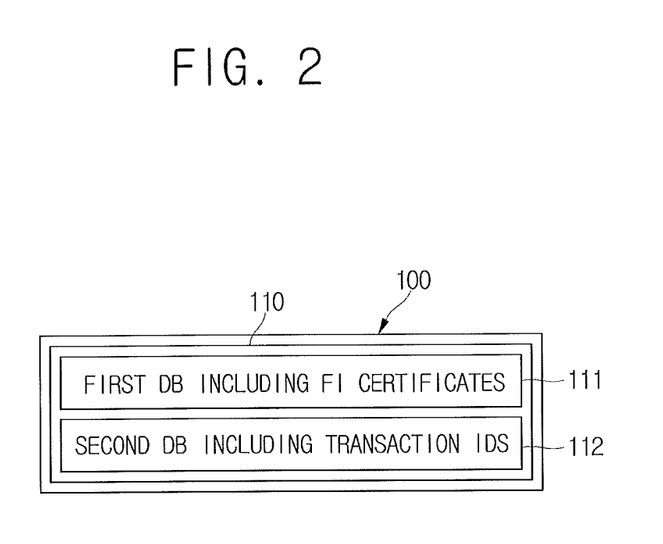
FIG. 2 is a block diagram illustrating an FI terminal of the system for verifying the FI certificate based on the blockchain in accordance with the present invention.
Figure 3:
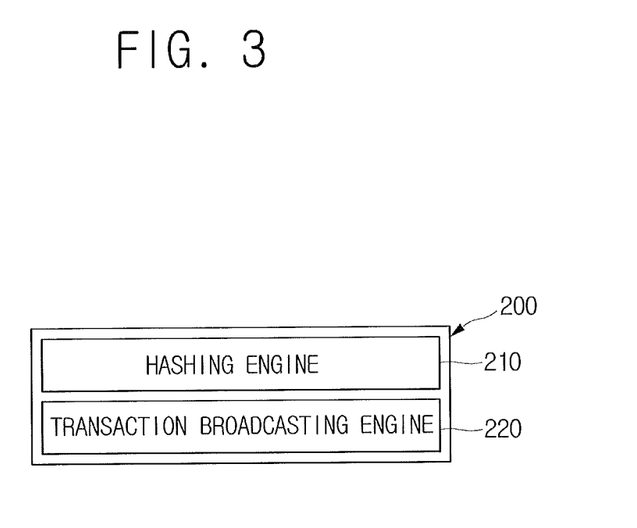
FIG. 3 is a block diagram illustrating a managing server of the system for verifying the FI certificate based on the blockchain in accordance with the present invention.
Figure 4:
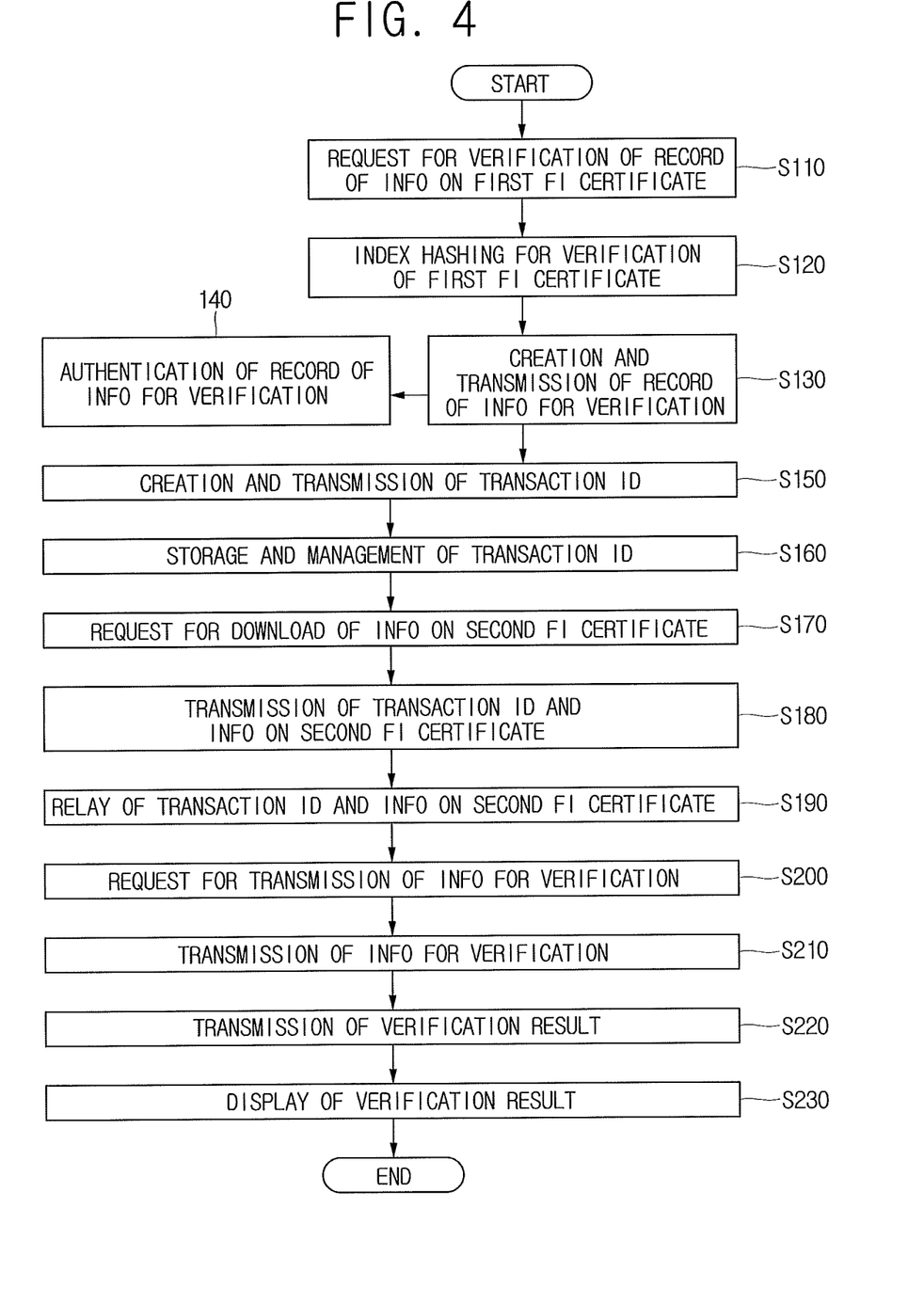
FIG. 4 is a flow chart illustrating a process of verifying authenticity of the FI certificate issued from a financial institution by using the system for verifying the FI certificate based on the blockchain in accordance with one example embodiment of the present invention.

FIG. 1 is a configurational diagram illustrating a system for verifying a financial institution (FI) certificate based on a blockchain in accordance with the present invention, FIG. 2 is a block diagram illustrating an FI terminal of the system for verifying the FI certificate based on the blockchain in accordance with the present invention, FIG. 3 is a block diagram illustrating a managing server of the system for verifying the FI certificate based on the blockchain in accordance with the present invention, and FIG. 4 is a flow chart illustrating a process of verifying authenticity of the FI certificate issued from a financial institution by using the system for verifying the FI certificate based on the blockchain in accordance with one example embodiment of the present invention.

As illustrated, the system for verifying the FI certificate based on the blockchain in accordance with the present invention may include the FI terminal 100, the managing server 200, blockchain servers 300, and a client terminal 400.

First of all, the FI terminal 100 may be a terminal operated by a bank, a fiduciary institution, an insurance company, and a securities company that accept and manage deposits and make loans to other companies or persons, or investments in stocks, etc., and may (i) request a verification of record of information on a first FI certificate, which is initially issued from a financial institution, when the information on the first FI certificate to be provided to clients by the financial institution is created, (ii) record a transaction ID transmitted in response to the request of the verification of record, and (iii) if a request is made for determining whether a second FI certificate, which is later issued at the demand of a client, is verified or not, transmit the information on the second FI certificate and its corresponding transaction ID.

For this purpose, the FI terminal 100 may include a DB part 110.

Specifically, the DB part 110 may include a first DB 111 where the information on FI certificates to be provided to clients by financial institutions is stored and a second DB 112 where transaction IDs used as key values to search for the transaction information for verification are stored.

The blockchain servers 300 are devices composing a bitcoin network that performs bitcoin transactions by verifying and recording the transactions.

Herein, the bitcoin is briefly explained. Bitcoin is a digital currency capable of payment in kind made by Satoshi Nakamoto in 2009, and has a decentralized structure which does not have a central device that issues and manages the currency. Rather, the transactions of bitcoin are processed by a distributed database based on a peer-to-peer (P2P) network and public key encryption.

Having a payment method as such, bitcoin has advantages that payment is possible without using information required for credit card transactions such as card numbers, expiration dates, and CCV numbers and that fees are inexpensive. Further, bitcoin is stored in an e-wallet which is an electronic file, and a unique address, i.e., a public address, is allocated to this e-wallet, and the bitcoin transactions are processed based on the address.

In order to use bitcoin with such transactional characteristics, first of all, a bitcoin user may sign in to a bitcoin exchange, e.g., www.coinplug.com, and make an e-wallet then load it with KRW, i.e., Korean Won.

Thereafter, after confirming a current exchange rate of bitcoin at the exchange, the bitcoin user may place a buying order including an amount and a unit price of bitcoin. If a selling order matching the buying order exists, then a transaction occurs and the bitcoin user may pay with bitcoin for a product.

The blockchain servers 300 may, as aforementioned, be linked with one or more servers operated by the bitcoin exchange.

For this purpose, the respective blockchain servers 300 may have e-wallets containing the blockchain, and if transaction information created by a typical bitcoin payment is transmitted to the blockchain, this transaction information may be verified to certify the bitcoin payment, and then the transaction information may be recorded and transmitted to the blockchain servers 300. In other words, the transaction information is broadcast.

Herein, the broadcast of the transaction information for bitcoin payment is defined by a protocol. For example, one node broadcasts initial transaction information for bitcoin payment to eight designated nodes, and each of the eight designated nodes that received the information broadcasts again to another eight designated nodes in a pyramidic fashion, and the broadcast is completed when the information is transmitted to all of the blockchain servers 300 which have the e-wallets containing the blockchain required for bitcoin payment.

Therefore, any information recorded on the blockchain including the transaction information for bitcoin payment cannot be tampered with.

Meanwhile, such the blockchain servers 300 may be linked with a server or a terminal operated by a bitcoin miner, or with a user's terminal for bitcoin payment, e.g., a PC or a smart phone.

In case of the bitcoin payment, the payment is based on the e-wallet containing the blockchain, and payment methods based on the e-wallet containing the blockchain may also include Litecoin, DarkCoin, Namecoin, Dogecoin, and Ripple, and these may be used instead of bitcoin when verifying authenticity of the FI certificate in accordance with the present invention.

Further, the blockchain of the blockchain servers 300 may include private information as well as the transaction information for bitcoin payment. That is, the transaction information for verification may also be recorded that includes an index hash value which is a processed value, by a hashing algorithm, of the information on the FI certificate provided to the client by the financial institution.

That is, if the transaction information for bitcoin payment in which an Operation Code [RETURN] is enclosed is transmitted, then each e-wallet in the respective blockchain servers 300 broadcasts the transaction information as private information, not as information representing a bitcoin payment, and an inclusion of the Operation Code [RETURN] into the transaction information for verification plays a major role in determining authenticity of digital contents.

Herein, if the e-wallets of the blockchain servers 300 detect an Operation Code [RETURN] in the transaction information for bitcoin payment when certifying the bitcoin payment, the e-wallets may send a notification that the information with the Operation Code [RETURN] in it is used to represent an arbitrary 40 byte long data, not transaction information.

The managing server 200 may be a server that (i) generates a first index hash value which is an index hash value, to be used for referring to the first FI certificate, acquired from applying the hashing algorithm to the information on the first FI certificate at a request for the verification of record from the FI terminal 100, (ii) creates, transmits and stores the transaction information for verification including the first index hash value, for the verification of record, and (iii) acquires the transaction ID and then transmits to the FI terminal 100, where the transaction ID is used as a key value to search for the transaction information for verification.

For this purpose, the managing server 200 may include a hashing engine 210 and a transaction broadcasting engine 220.

The hashing engine 210 may perform processing of the information on the first FI certificate to acquire the first index hash value by using the hashing algorithm, and the first index hash value may be used in a procedure below. That is, if the information on the second FI certificate and the transaction ID are transmitted from the client terminal 400, (i) a second index hash value, which is an index hash value to be used for verifying the second FI certificate, may be acquired by processing the information on the second FI certificate included in the transmitted information using the hashing algorithm, (ii) the transaction ID included in the transmitted information may be sent to the blockchain servers 300 in order to request the transaction information for verification, (iii) the first index hash value acquired from the transaction information for verification transmitted from the blockchain servers 300 at the request in the previous step and the second index hash value may be compared, (iv) a verification result representing whether the above-mentioned two hash values are identical to each other may be generated, and (v) this verification result may be transmitted to the client terminal 400.

Also, the transaction broadcasting engine 220 may (i) create and record the transaction information for verification including (i-1) the first index hash value stored in a DB 211 of index hash values for verification and (i-2) an Operation Code [RETURN] which supports the transaction information to be handled as private information, on a DB of the transaction information for verification and (ii) send the transaction information for verification to the blockchain servers 300.

Herein, the managing server 200 may include the e-wallet if the managing server 200 performs a function of bitcoin transaction.

Herein, the managing server 200 may not send right away the transaction information for verification to the blockchain servers 300 for verification. Instead, if the managing server 200 inputs the transaction information for verification into its e-wallet, the e-wallet of the managing server 200 may (i) read the transaction information for verification to thereby detect the Operation Code [RETURN], (ii) record the transaction information for verification including the first index hash value on the blockchain for the verification of record without certifying the bitcoin transaction, and then the managing server 200 may transmit the transaction information for verification to the blockchain servers 300.

Therefore, if the information on the second FI certificate and the transaction ID are transmitted from the client terminal 400, the hashing engine 210 may acquire a value identical to the first index hash value of the transaction information for verification recorded on the blockchain servers 300 by matching the transaction ID directly with information included in the blockchain of the e-wallet in the managing server 200, without sending the transaction ID to the blockchain servers 300.

Thereafter, the client terminal 400 may (i) transmit a request for a download of the information on the second FI certificate to the FI terminal 100, (ii) transmit the information on the second FI certificate and the transaction ID, downloaded from the FI terminal 100 in response to the download request, to the managing server 200, (iii) request verification of authenticity of the second FI certificate, and (iv) display the verification result sent from the managing server 200 through a screen of the client.

The description of processes of verifying authenticity of the FI certificate issued by the financial institution in accordance with the present invention is as follows:

First, if the information on the first FI certificate for the client is created by the FI terminal 100, a personnel of the financial institution who operates the FI terminal 100 may (i) record the information on the first FI certificate in a first DB 111, (ii) transmit the information on the first FI certificate to the managing server 200 in order to request the verification of record of the information on the first FI certificate at a step of S110.

Thereafter, if the information on the first FI certificate is transmitted from the FI terminal 100, upon acquiring the first index hash value by processing the information on the first FI certificate using the hashing algorithm of the hashing engine 210 at a step of S120, the managing server 200 may instruct the transaction broadcasting engine 220 to (i) create the transaction information for verification including the first index hash value and the Operation Code [RETURN], and (ii) transmit the transaction information for verification to the blockchain servers 300 at a step of S130.

If the transaction information for verification is transmitted from the managing server 200, each of the e-wallets of the blockchain servers 300 may (i) read the transaction information for verification to thereby detect the Operation Code [RETURN], (ii) record the transaction information for verification including the first index hash value on the blockchain to perform the verification of record without certifying the bitcoin payment, at a step of S140.

Thereafter, the managing server 200 may (i) instruct the transaction broadcasting engine 220 to acquire the transaction ID which is used as a key value to search for the transaction information for verification, and (ii) transmit the transaction ID to the FI terminal 100 at a step of S150.

The FI terminal 100 may record the transaction ID transmitted from the managing server 200 on a second DB at a step of S160.

Meanwhile, the client of the financial institution may transmit a request for the download of the information on the second FI certificate using the client terminal 400 to the FI terminal 100, to verify authenticity of the second FI certificate, at a step of S170.

Thereafter, if the FI terminal 100 transmits the information on the second FI certificate and the transaction ID to the client terminal 400 at a step of S180, the client terminal 400 may transmit the information on the second FI certificate and the transaction ID to the managing server 200 in order to request the verification of authenticity of the second FI certificate at a step of S190.

Thereafter, if the information on the second FI certificate and the transaction ID are received, the managing server 200 may transmit the transaction ID to the blockchain servers 300 in order to request transmission of the transaction information for verification at a step of S200.

Further, each of the e-wallets of the blockchain servers 300 may (i) match the transaction ID received from the managing server 200 with transaction information in the blockchain, and (ii) transmit the matching transaction information for verification to the managing server 200 at a step of S210.

Herein, because each piece of the transaction information for verification transmitted from each of the blockchain servers 300 is identical to each other, the managing server may be programmed so that the transaction information for verification is transmitted from a designated one of the blockchain servers 300.

Thereafter, the managing server 200 may (i) instruct the hashing engine 210 to acquire the second index hash value from the information on the second FI certificate transmitted by the client terminal 400 using the hashing algorithm, (ii) compare the first index hash value acquired from the transaction information for verification transmitted from the blockchain servers 300 and the second index hash value acquired by using the hashing algorithm, and (iii) create the verification result representing whether the two hash values are identical to each other.

That is, if the two hash values are identical, the verification result representing that the second FI certificate issued by the financial institution is authentic may be created. If the two hash values are not identical, the verification result representing that the second FI certificate issued by the financial institution is not authentic may be created.

Thereafter, the managing server 200 may transmit the created verification result to the client terminal 400 at a step of S220.

Then, the client terminal 400 may output the verification result transmitted from the managing server 200 to a display part thereof for the client's viewing at a step of S230.

Thus, the client may be provided with valid financial documents by confirming authenticity of various certificates issued by the financial institution.

Meanwhile, there may be a possibility of leakage of confidential documents because various information on FI certificates issued by the financial institutions is transmitted to the managing server 200 for the verification of authenticity.

To prevent this leakage from happening, another example embodiment of the present invention is provided.

Figure 5:
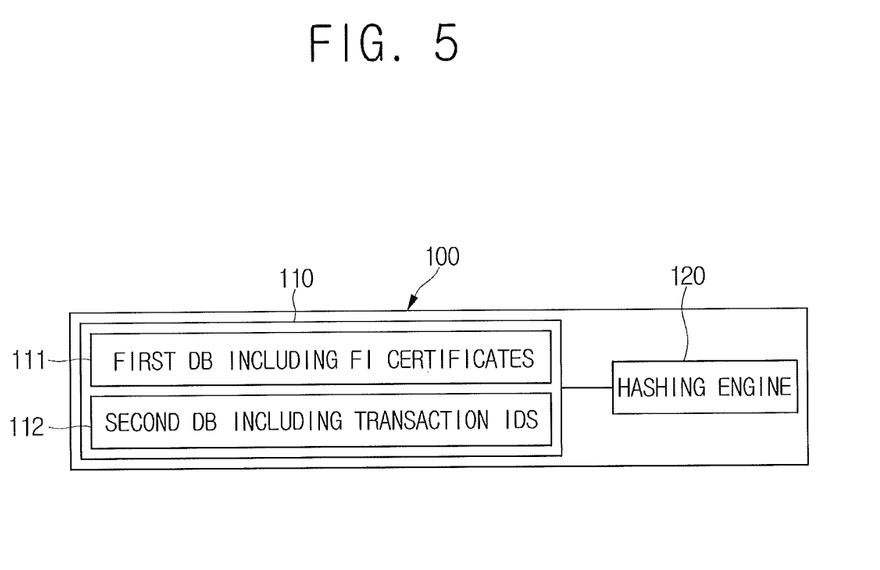
FIG. 5 is a block diagram illustrating the FI terminal of the system for verifying the FI certificate based on the blockchain in accordance with another example embodiment of the present invention.
Figure 6:
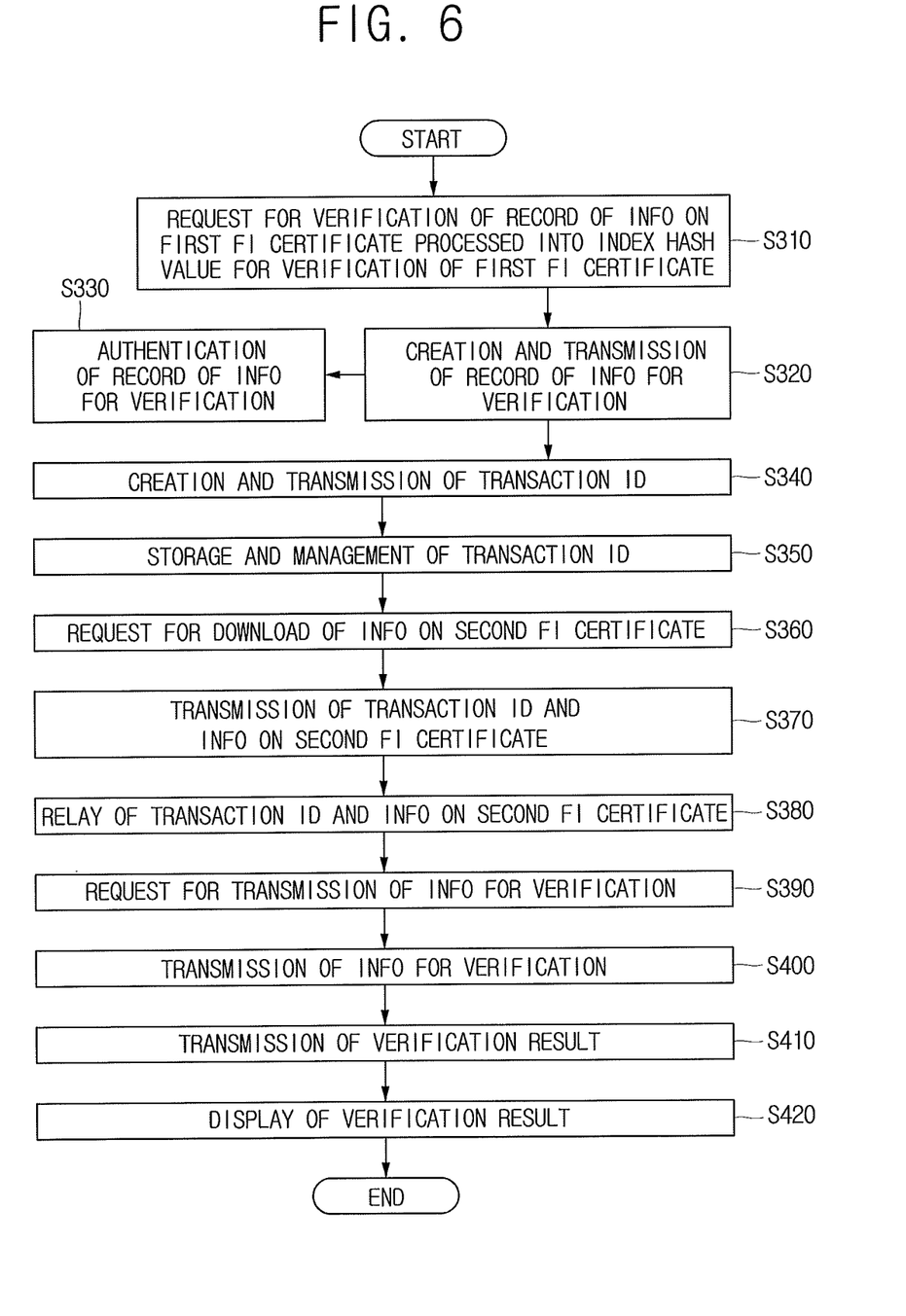
FIG. 6 is a flow chart illustrating a process of verifying authenticity of the certificate issued from the financial institution by using the system for verifying the FI certificate based on the blockchain in accordance with another example embodiment of the present invention.

FIG. 5 is a block diagram illustrating the FI terminal of the system based on the blockchain in accordance with the another example embodiment of the present invention and FIG. 6 is a flow chart illustrating a process of verifying authenticity of an FI certificate issued from the financial institution by using the system based on the blockchain in accordance with the another example embodiment of the present invention.

Herein, although the FI terminal 100, the managing server 200, the blockchain servers 300, and the client terminal 400, which are included in the technical configuration in accordance with the aforementioned example embodiment, are the same, their internal composition and operational architecture may be partly different. Further, like numerals refer to the same or similar functionalities throughout the several views, and the details in accordance with the another example embodiment of the present invention are disclosed below.

That is, in accordance with another example embodiment of the present invention, the internal composition and the operational architecture of the FI terminal 100 and the client terminal 400 may have a difference, and the operational architecture of the managing server 200 may have a difference although its internal composition may not.

First, the hashing engine 120 may be embedded in the FI terminal 100 to perform a process of the verification of authenticity without transmitting the information on the FI certificate to the managing server 200.

The FI terminal 100 may (i) instruct the hashing engine 120 to acquire the first index hash value by processing the information on the first FI certificate using the hashing algorithm, which is the first FI certificate created for the client by the financial institution, (ii) transmit a request for the verification of record of the first index hash value to the managing server 200, (iii) record the transaction ID transmitted from the managing server 200 in response to the verification request, and (iv) transmit the requested information on the second FI certificate and the transaction ID to the client terminal 400 if the client terminal 400 requests the download of the information on the second FI certificate.

Further, the hashing engine may also be embedded in the client terminal 400, thus if the information on the second FI certificate and the transaction ID are transmitted from the FI terminal 100 in response to the request sent to the FI terminal 100 for the download of the information on the second FI certificate, then the client terminal 400 may (i) instruct the hashing engine to acquire the second index hash value by processing the information on the second FI certificate using the hashing algorithm, and (ii) transmit the second index hash value and the transaction ID to the managing server 200.

Therefore, characteristic of said another embodiment of the present invention is that the managing server 200 may be a server that (i) creates and transmits the transaction information for verification including the first index hash value transmitted from the FI terminal 100 in response to a request for the verification of record, and (ii) acquires the transaction ID which is used as a key value for searching for the transaction information for verification and then transmits the transaction ID to the FI terminal 100.

The description of processes of verifying authenticity of the FI certificate based on the blockchain in accordance with another example embodiment of the present invention is as follows.

The FI terminal 100, if the information on the first FI certificate for the client is created, may (i) record the information on the first FI certificate on the first DB 111, (ii) instruct the hashing engine 120 to acquire the first index hash value by processing the created information on the first FI certificate using the hashing algorithm, and (iii) transmit the first index hash value to the managing server 200 in order to request the verification of record of the information on the first FI certificate at a step of S310.

Thereafter, the managing server 200 may (i) instruct the transaction broadcasting engine 220 to create the transaction information for verification including (i-1) the transmitted first index hash value and (i-2) the Operation Code [RETURN], and (ii) transmit the transaction information for verification to the blockchain servers 300 at a step of S320.

If the transaction information for verification is transmitted from the managing server 200, each of the e-wallets of the blockchain servers 300 may (i) read the transaction information for verification to thereby detect the Operation Code [RETURN] and (ii) record the transaction information for verification including the first index hash value on the blockchain to perform the verification of record without certifying the bitcoin payment at a step of S330.

Thereafter, the managing server 200 may (i) instruct the transaction broadcasting engine 220 to acquire the transaction ID which is used as a key value to search for the transaction information for verification and (ii) transmit the transaction ID to the FI terminal 100 at a step of S340.

The FI terminal 100 may record the transaction ID transmitted from the managing server 200 on the second DB 112 at a step of S350.

Meanwhile, the client of the financial institution may transmit a request for the download of the information on the second FI certificate using the client terminal 400 to the FI terminal 100, for verifying authenticity of the second FI certificate, at a step of S360.

Thereafter, if the FI terminal 100 transmits the information on the second FI certificate and the transaction ID to the client terminal 400 at a step of S370, the client terminal 400 may (i) instruct the hashing engine to acquire the second index hash value by processing the information on the second FI certificate using the hashing algorithm, and (ii) transmit the second index hash value and the transaction ID to the managing server 200 in order to request the verification of authenticity of the information on the second FI certificate at a step of S380.

Thereafter, if the second index hash value and the transaction ID are received, the managing server 200 may transmit the transaction ID to the blockchain servers 300 in order to request transmission of the information for verification at a step of S390.

Further, each of the e-wallets of the blockchain servers 300 may (i) match the transaction ID received from the managing server 200 with information in the blockchain, and (ii) transmit the transaction information for verification matching the transaction ID to the managing server 200 at a step of S400.

Thereafter, the managing server 200 may (i) instruct the hashing engine 210 to acquire (i-1) the first index hash value of the transaction information for verification received from the blockchain servers 300 and (i-2) the second index hash value, and (ii) create the verification result representing whether the above-mentioned two hash values are identical to each other.

That is, if the two hash values are identical, the verification result representing that the second FI certificate issued by the financial institution is authentic may be created. If the two hash values are not identical, the verification result representing that the second FI certificate issued by the financial institution is not authentic may be created.

Thereafter, the managing server 200 may transmit the created verification result to the client terminal 400 at a step of S410.

Then, the client terminal 400 may output the verification result transmitted from the managing server 200 to the display part for the client's viewing at a step of S420.

The present invention has an effect of accurately verifying authenticity of the FI certificate issued from the financial institution by comparing the first FI certificate for the client initially issued from the financial institution and the second FI certificate re-issued later at the request of the client, without regard to whether its watermark is verified or not.

What is claimed is:

1. A method comprising:

a managing server creating a transaction information and transmitting the transaction information to a first blockchain server among a plurality of blockchain servers for storage in each of the plurality of blockchain servers, the transaction information including a first index hash value of a first financial institution certificate, the first financial institution certificate being issued from a first financial institution;

each of the blockchain servers storing the transaction information along with a transaction ID in a manner such that the transaction information and transaction ID cannot be changed electronically, and one of the plurality of blockchain servers transmitting the transaction ID to the managing server;

the managing server transmitting to a financial institution terminal the transaction ID, received from the one of the plurality of blockchain servers, and corresponding to the transaction information;

a user terminal transmitting to the financial institution terminal a first request for the first financial institution certificate;

the financial institution terminal transmitting to the user terminal the transaction ID and a second financial institution certificate issued from the first financial institution and issued subsequent to the first financial institution certificate in response to the first request, wherein the financial institution terminal includes a first hashing engine configured to generate the first index hash value by processing the first financial institution certificate with a hashing algorithm to create the first index hash value;

the user terminal including a second hashing engine configured to generate a second index hash value by processing the second financial institution certificate with a hashing algorithm to create the second index hash value and transmitting to the managing server a second request for determining whether the second financial institution certificate is verified, wherein the second request includes the transaction ID and the second index hash value;

the managing server acquiring the transaction information from one of the plurality of blockchain servers using the transaction ID;

the managing server comparing (i) the first index hash value associated with the first financial institution certificate, and (ii) the second index hash value associated with the second financial institution certificate and determining if there is a match between the first hash value and the second hash value; and the managing server providing to the user terminal a verification result generated by comparing the first index hash value and the second index hash value, the verification result including an indication that the second financial institution certificate is authentic in response to the managing server determining that the match exists, and the verification result including an indication that the second financial institution certificate is not authentic in response to the managing server determining that the match does not exist.

2. The method of claim 1, further comprising retrieving the transaction information from one of the plurality of blockchain servers by using the transaction ID as key value to search for the transaction information and then transmitting the transaction information from an e-wallet of the one of the plurality of blockchain servers.

3. The method of claim 1, wherein the managing server creating the verification result of the second financial institution certificate, the verification result serving as an indication that the second financial institution certificate is not forged in response to the first index hash value and the second index hash value being identical to each other, and wherein the verification result further serves as an indication that the second financial institution certificate is forged in response to the first index hash value and the second index hash value not being identical to each other.

4. The method of claim 1, wherein the transaction information includes the first index hash value and operation code return information.

5. A system comprising:
a user terminal configured to
transmit a first request for a first financial institution certificate, the first financial institution certificate being issued from a first financial institution,
receive a transaction ID and a second financial institution certificate in response to the first request, the second financial institution certificate being issued from the first financial institution and issued subsequent to the first financial institution certificate in response to the first request,
generate a second index hash value by processing the second financial institution certificate with a hashing algorithm to create the second index hash value
transmit a second request for determining whether the second financial institution certificate is verified, wherein the second request includes the transaction ID and the second index hash value, and configured to receive verification result in response to the second request;
a financial institution terminal configured to generate a first index hash value by processing the first financial institution certificate with a hashing algorithm to create the first index hash value,
transmit the first index hash value of the first financial institution certificate,
receive the transaction ID in response to the first financial institution certificate, and
transmit to the user terminal the transaction ID and the second financial institution certificate in response to the first request;
a first blockchain server among a plurality of blockchain servers configured to receive the transaction information and store the transaction information along with the transaction ID in each of the plurality of blockchain servers in a manner such that the transaction information and transaction ID cannot be changed electronically, and configured to transmit the transaction ID; and
a managing server configured to
create the transaction information and transmit to the first blockchain server the transaction information, the transaction information including the first index hash value, wherein creating the transaction information includes generating the first index hash value by obtaining from the financial institution terminal the first index hash value,
transmit to the financial institution terminal the transaction ID, received from the first blockchain server, and corresponding to the transaction information,
acquire the transaction information from the first blockchain server using the transaction ID in response to the second request from user terminal,
compare (i) the first index hash value associated with the first financial institution certificate, and (ii) a second index hash value associated with the second financial institution certificate and determining if there is a match between the first hash value and the second hash value; and
provide to the user terminal the verification result generated by comparing the first index hash value and the second index hash value, the verification result including an indication that the second financial institution certificate is authentic in response to the managing server determining that the match exists, and the verification result including an indication that the second financial institution certificate is not authentic in response to the managing server determining that the match does not exist.

6. The system of claim 5, wherein the transaction information was retrieved from the first blockchain server by using the transaction ID and then transmitted from an e-wallet of the first blockchain server.

7. The system of claim 5, wherein the transaction information includes the first index hash value and operation code RETURN information.

* * * * *